United States Patent

[11] 3,631,762

[72] Inventor Joe E. Fuzzell
 Peoria, Ill.
[21] Appl. No. 71,764
[22] Filed Sept. 14, 1970
[45] Patented Jan. 4, 1972
[73] Assignee Caterpillar Tractor Co.
 Peoria, Ill.

[54] MECHANISM FOR CONTROLLING A VEHICLE FROM A REMOTE LOCATION
 7 Claims, 6 Drawing Figs.

[52] U.S. Cl.................................................. 91/411 R,
 91/427, 91/459, 60/DIG. 2, 60/19
[51] Int. Cl........................................................ F15b 11/16
[50] Field of Search............................................. 91/411 R,
 427, 459; 60/DIG. 2, 19, 52 HE

[56] References Cited
 UNITED STATES PATENTS
 2,234,019 4/1941 Bragg........................... 91/427 X
 2,446,149 7/1948 Wells............................ 91/411 R
 2,643,515 6/1953 Harsch........................ 60/DIG. 2

*Primary Examiner*—Edgar W. Geoghegan
*Attorney*—Fryer, Tjensvold, Feix, Phillips & Lempio

ABSTRACT: Control linkages of a crawler tractor loader which are normally manipulated by an operator may be shifted by hydraulic jacks controlled by solenoid valves and electrical switches which respond to electrical signals received from a remote location by radio or a cable or the like. When the controls are manipulated by an operator on the vehicle, the jacks may move as necessary to avoid interference with the operator control. To provide for remote control, hydraulic means serve to clamp one end of the jacks whereby extension and retraction of the jacks necessarily operates the control linkages. To shift control linkages to any of a series of predetermined positions, certain jacks may have a compound construction with two pistons and have rods extending from each end. The pistons may be operated individually or jointly to achieve a variety of degrees of extension and contraction of the jack.

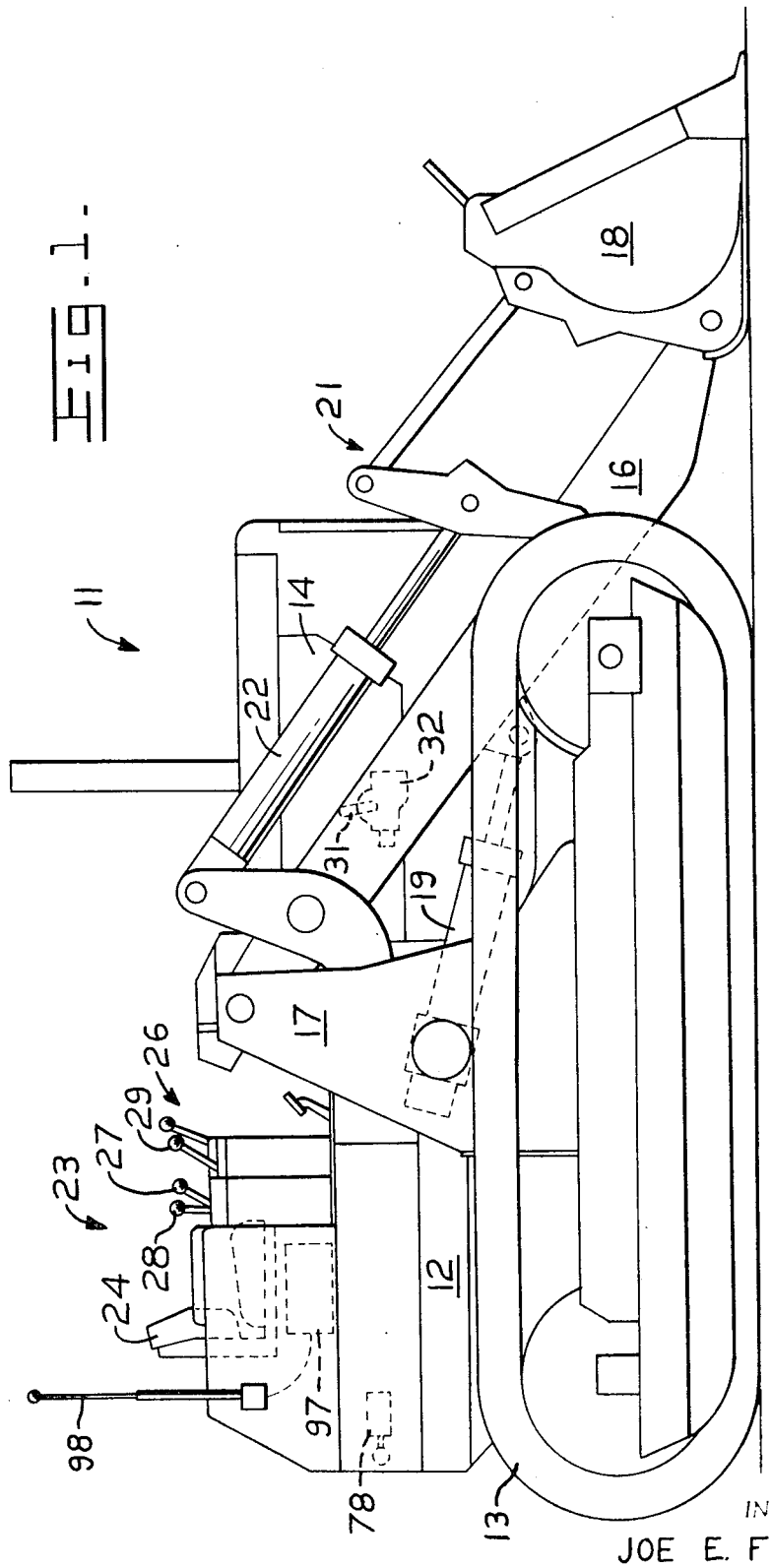

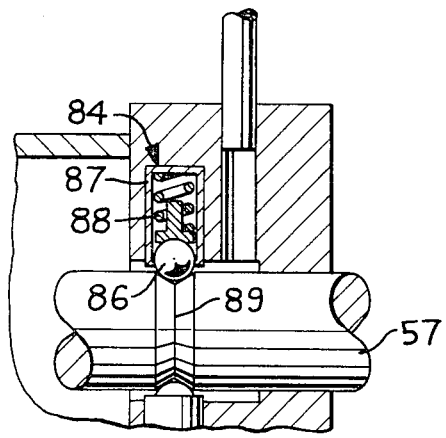
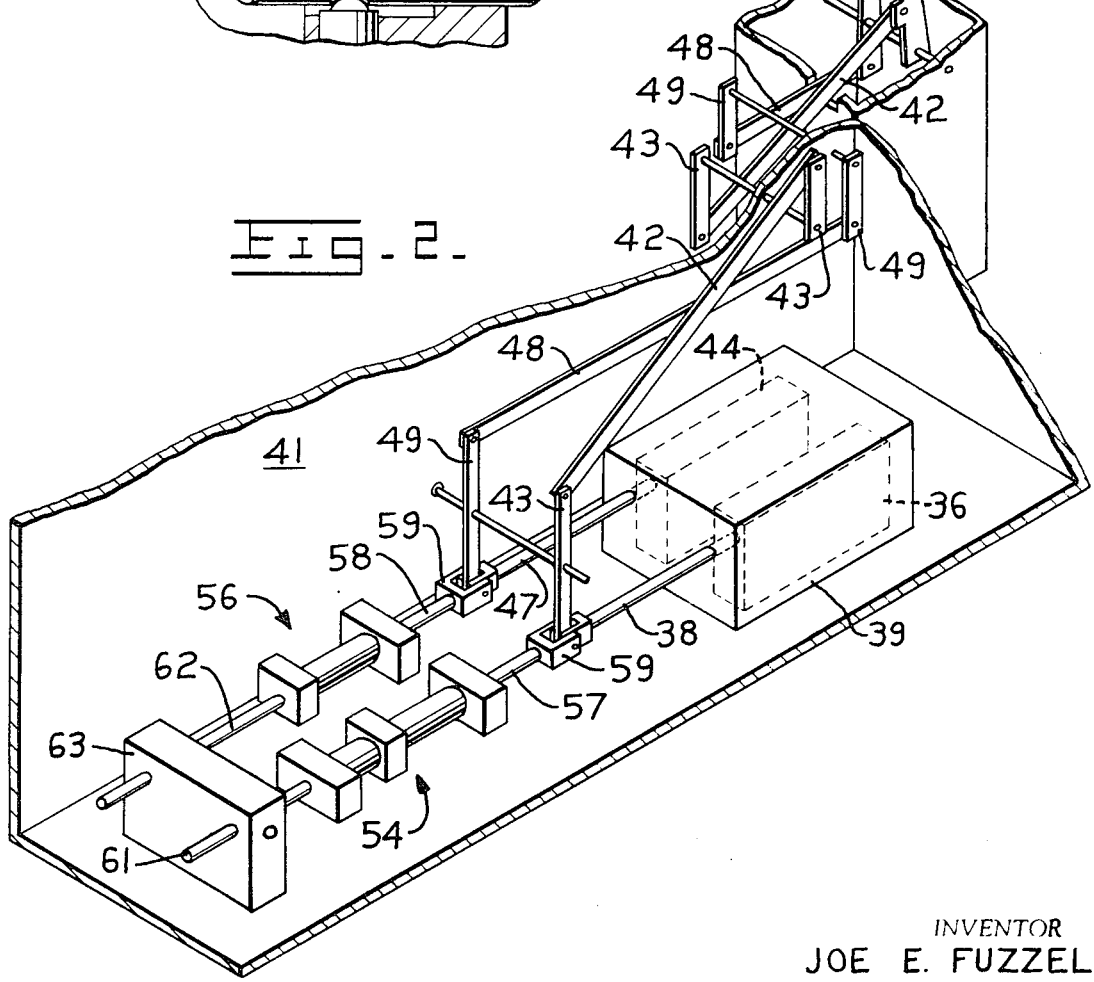

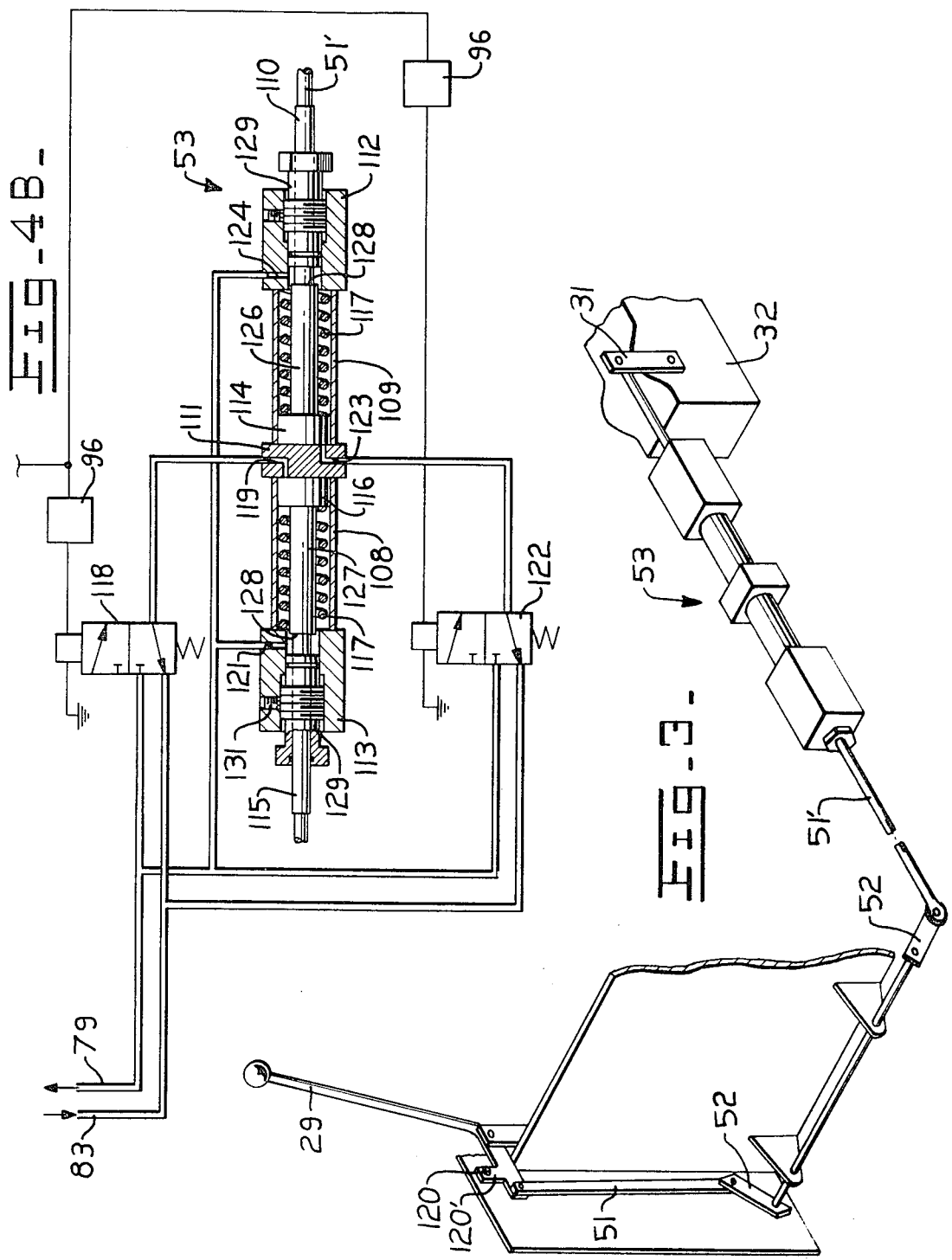

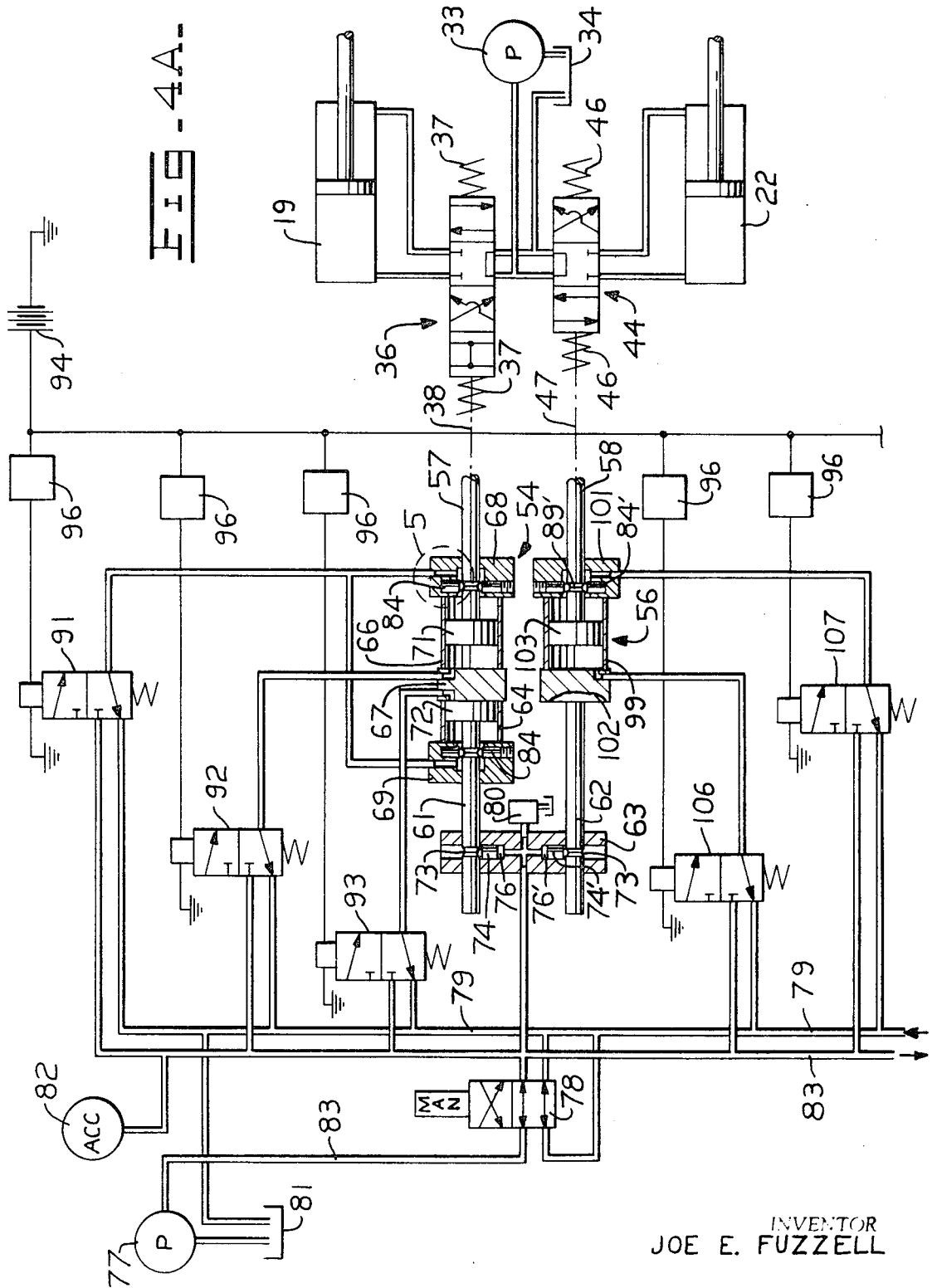

3,631,762

MECHANISM FOR CONTROLLING A VEHICLE FROM A REMOTE LOCATION

BACKGROUND OF THE INVENTION

This invention relates to the control of powered vehicles and more particularly to mechanisms for controlling a vehicle in response to signals originating at a remote location.

Vehicles such as tractors, loaders and the like which normally carry a human operator are sometimes used under conditions in which control from a remote location is necessary. Loaders, for example, may be used in steel mills in close proximity to furnaces under temperature conditions which are discomforting or intolerable to an operator. Many other circumstances may also require remote control of a vehicle that is basically designed to carry an operator.

While a large number of systems have been heretofore designed for the purpose of remotely controlling various forms of vehicles, these have in general been complex and costly and are often incompatible with optional control of the vehicle by an operator in the conventional manner. A remote control system which avoids these problems is described in copending application Ser. No. 822,368 of Joe E. Fuzzell, filed May 7, 1969 entitled "Remote Control System for Load Manipulating Vehicles." In the system described in the copending application, a crawler tractor loader having a set of conventional operator's control levers and pedals and is modified by replacing one of the rigid links connected to each control lever and pedal with a hydraulic jack. The jacks are inactivated when an operator is situated on the vehicle and simply function as rigid linkage elements at that time. The system is readily adapted for remote control by immobilizing the various control levers and pedals and then activating the jacks in response to radio signs is or the like from a remote source. The system is compact, inexpensive and reliable and includes means by which a particular control linkage may be made to assume any of a series of predetermined positions in response to signals from a remote location.

Most of the conventional manually operated control linkages of a vehicle are spring biased towards some predetermined position. In the system of the above-identified copending application, the jacks which provide for optional remote control require internal piston positioning springs stronger than those of the associated linkages so that when the vehicle is operated manually, the jacks transmit movement like a rigid link instead of absorbing the movement. However, under remote control operation, both the internal springs and the spring biasing of the control linkage must be overcome by fluid pressure applied to the jack. This requires that heavy springs be used in the jacks and it is then necessary that the jacks be sizable or that high fluid pressures be provided for operating the jacks. These factors may, in turn, adversely affect the response time of the remote control system as a whole. While these problems are not critical in many vehicle designs, certain others have characteristics, such as relatively strong spring forces acting on the control linkages, which aggravate the problem. In the latter instances, it would be highly desirable to provide a system which does not require internal springs in the remote control jacks so that lighter jacks and/or lesser fluid pressures maybe utilized and fast response times may be realized.

Still another problem may be encountered in certain particular vehicle designs if it is necessary to remotely adjust a linkage to a position intermediate between the maximum and minimum possible extension of the associated remote control jack. Prior systems, which depend on a sensor device controlling a valve which interrupts the flow of fluid to the jack tend to exhibit a small degree of inconsistency with respect to realizing the intermediate control linkage settings. This can become a serious problem in particular vehicle designs where the maximum travel of a control linkage between extreme positions is relatively small. Under this condition the positional variation in the intermediate setting may correspond to a significant proportion of the total travel of the control linkage.

SUMMARY OF THE INVENTION

This invention provides fluid-operated mechanisms for shifting control linkages of a vehicle in response to electrical signals from a remote source wherein the fluid cylinders do not, in most cases, require internal springs to prevent unwanted extension and contraction when the vehicle is controlled in the normal manner by an operator situated thereon. This is accomplished by retaining all of the existing linkage between a given control lever and the vehicle component controlled thereby while coupling only one end of an extensible and contractable jack to the linkage. The other end of the jack may slide freely when the vehicle is controlled by an operator thereon so that the jack does not interfere with conventional control of the vehicle under this condition. To provide for remote control, damping means provide for locking one end of the jack at a fixed position. When the clamping means is engaged, extension or contraction of the jack in response to signals from a remote source operates the associated linkage to control the vehicle. In a preferred form of the invention, certain of the fluid cylinders have a compound construction including two pistons and extensible rods arranged in a linear relationship wherein the pistons may be operated individually or jointly to shift the associated control linkage to any of a series of positions.

Accordingly, it is an object of this invention to provide a fluid cylinder system for operating a powered vehicle in response to signals from a remote location wherein having cylinder constructions which would not require internal positioning springs and wherein the system is readily convertible between remotely controlled operation and control by an operator on the vehicle.

It is a further object of the invention to provide a fluid cylinder operated system for controlling a vehicle in response to signals from a remote source having cylinder mechanisms which may shift an associated control linkage to any of several predetermined positions without requiring external motion-sensing means for defining the several positions.

It is still another object of the invention to provide fluid cylinder mechanism for operating a vehicle control linkage in response to signals from a remote source wherein the cylinder means consistently positions an associated control linkage at a predetermined precise intermediate point between the extremes of travel thereof.

The invention together with further objects and advantages thereof will best be understood by reference to the following description of a preferred embodiment in conjunction with the accompanying drawings.

BRIEF DESCRIPTION OF THE DRAWINGS

In the accompanying drawings:

FIG. 1 is a side elevation view of a crawler tractor loader having controls for manipulation by an operator situated on the vehicle and further having means for operating said controls in response to radio signals from a remote location;

FIG. 2 is a perspective view illustrating the operator's control levers for controlling the bucket of the loader together with means for optionally operating the levers in response to signals from a remote location;

FIG. 3 is a perspective view showing the operator's throttle lever and control linkages for the engine governor of the vehicle of FIG. 1 including means for optionally operating the governor control linkage in response to signals from a remote source;

FIGS. 4A and 4B, which may be juxtaposed to form a single figure, show internal details of hydraulic jack means for operating the bucket control linkages and governor control linkage respectively, together with electrohydraulic circuit means for controlling the jacks in response to the signals from a remote location; and FIG. 5 is a fragmentary section view of the area of FIG. 4A enclosed by dashed line 5 thereon showing detent means associated with one of the hydraulic jacks thereof.

DESCRIPTION OF A PREFERRED EMBODIMENT

Referring now to the drawing and more particularly to FIG. 1 thereof, the invention will be herein described as applied to a crawler tractor loader 11, it being apparent that the system may be similarly utilized in a variety of other powered vehicles.

A crawler loader 11 includes a body 12 riding on endless track mechanisms 13 which are driven by an engine 14. Lift arms 16 are pivoted at the back end to loader towers 17 attached to body 12 and carry a bucket 18 pivotally attached to the forward end of the lift arms for manipulating earth or other material. Extensible and contractable lift jacks 19 are connected between towers 17 and lift arms 16 for the purpose of selectively raising and lowering bucket 18. Conventional tilt linkage 21 is coupled between bucket 18, lift arms 16 and loader towers 17 in a manner well understood within the art to maintain the bucket at a substantially constant inclination as the lift arms 16 are raised and lowered. The tilt linkage 21 includes tilt jacks 22 which may be extended and contracted to control the inclination of the bucket 18 relative to the lift arm 16 to load and dump material.

The loader 11 has an operator station 23 including a seat 24 and includes a conventional set of controls 26 by means of which an operator on the vehicle may control the loader.

Optional remote control mechanism in accordance with the present invention may be applied to each of the several operstor's controls 26. As essentially similar mechanism is used for various ones of the controls, the present description will be confined to remote control mechanisms for the operator's lift jack control lever 27, tilt jack control lever 28 and throttle lever 29 which typify the adaptation of the invention to the various controls. A complete system for remotely controlling such other functions as starting and stopping of the engine, steering and transmission shifting is described in the above identified copending application Ser. No. 822,368.

Lift control lever 27 is pulled back to extend the lift jack 19 and is pivoted forward to cause contraction of the lift jack through control valve mechanism to be hereinafter described. Similarly backward pivoting of tilt control lever 28 operates through mechanism to be hereinafter described to contract tilt jack 22 while forward pivoting of the tilt lever extends the tilt jack. Pivoting movement of the operator's throttle lever 29 pivots the speed-setting crank arm 31 of the engine governor 32 also by means to be hereinafter described.

Referring now to FIG. 4A, the lift jacks 19 are operated by fluid under pressure delivered by a suitable pump 33 from a reservoir 34 through a multiposition control valve 36 preferably of the spool type. Lift control valve 36 may be of conventional construction and thus has four positions including a Hold position at which both the rod and head ends of the jacks 19 are blocked while fluid from pump 33 is returned to reservoir 34, a Raise position at which fluid from pump 33 is transmitted to the head ends of the jacks while fluid from the rod ends is returned to reservoir 34, a Lower position at which fluid from the pump is transmitted to the rod ends of the jacks while the head ends of the jacks are communicated with the reservoir and a Float position at which the rod and head ends of the jacks are communicated with each other and with both the pump and reservoir. Springs 37 bias the lift control valve 36 towards the Hold position and a control link 38 is provided for selectively translating the control valve to one of the other positions against the action of the springs. Referring now to FIG. 2, the lift control valve 36 is situated within a control valve housing 39 within a hydraulic fluid tank 41 with the control link 38 protruding from the housing. The operator's lift control 29 is operatively coupled to the control line 38 through a suitable arrangement of connecting links 42 and crank arms 43 pivoted to adjacent stationary structure, such as tank 41, whereby manipulation of the lift control lever 27 translates the valve control link 38 to any selected one of the previously described valve positions.

Referring now again to FIG. 4A, the tilt jacks 22 are also operated by fluid under pressure from pump 33 in response to actuation of a tilt control valve 44. Tilt control valve 44 which is also preferably of the spool type has three positions including a Hold position of which the rod and head ends of jacks 22 are blocked while fluid from pump 33 is returned to reservoir 34, a Rackback position at which fluid from pump 33 is transmitted to the rod ends of jacks 22 while the opposite ends of the jacks are vented to reservoir 34, and a Dump setting at which fluid from the pump is transmitted to the head ends of the jacks 22 while the rod ends are vented to the reservoir. Springs 46 urge the control valve 44 towards the Hold position and a control link 47 is provided to selectively shift the valve to either of the other positions. Referring now again to FIG. 2, the tilt jack control valve 44 is also situated within housing 39 with the control link 47 protruding therefrom. Connecting links 48 and crank arms 49 couple the operator's tilt control lever 28 to control link 47 whereby manipulation of the control lever shifts the control valve 44.

Referring now to FIG. 3, control linkage including links 51 and crank arms 52 are provided to translate movement of the throttle lever 29 into pivoting movement of the control arm 31 of the engine governor 32 to provide for selectively varying the engine speed of the vehicle. For purposes which will hereinafter be described, one of the component links 51' connecting throttle lever 29 and governor 32 is formed in part by a compound hydraulic cylinder assembly 53 which functions effectively as a rigid link insofar as transmitting the operator's manipulation of throttle lever 29 to the engine governor is concerned.

With the exception of the cylinder assembly 53 in the throttle linkage, the loader control system as described to this point is essentially conventional and provides for manual control of the several functions of the loader 11 by an operator situated thereon. Considering now the means providing for optional control of vehicle functions in response to signals received from a remote location, with reference again to FIG. 2, a hydraulic cylinder assembly 54 is provided to operate the lift control valve link 38 in response to signals from a distant source and a hydraulic cylinder assembly 56 similarly may operate the control link 47 of tilt control valve 44. Hydraulic cylinders 54 and 56 are aligned along the axes of valve control links 38 and 47 respectively and have rods 57 and 58 respectively which connect to valve control links 38 and 47 by means of pivot couplings 59. Additional rods 61 and 62 extend axially from the opposite end of cylinders 54 and 56 through a support block 63 secured to the floor of tank 41. Rods 61 and 62 are slidable within support block 63 except during remote control as hereinafter described in more detail and thus the cylinders 54 and 56 and related elements do not interfere with manual control of the valves 36 and 44 by an operator situated on the vehicle as described above. Under this mode of control, the cylinder assemblies 54 and 56 simply shift axially as necessary when the lift and tilt control levers 27 and 28 are manipulated by an operator.

Considering now the internal construction of the lift remote control cylinder assembly 54, with reference again to FIG. 4A, the assembly consists of two axially spaced cylindrical members 64 and 66 separated by a center block 67. A front end block 68 closes the forward end of cylinder member 66 and a back block 69 closes the rear of cylinder member 64. The forwardly extending rod 57 which connects to the lift control valve operating link 38 transpierces front block 68 and connects with a forward piston 71 within cylindrical member 66. Rod 61 extends through back block 69 and is coupled to a back piston 72 slidingly disposed within cylindrical member 64.

As described above, the back rod 61 extends through support block 63 and is slidable therein when the loader is manipulated by an operator thereon. To provide for remote control, it is necessary to clamp rod 61 against movement relative to block 63 at a predetermined axial position. For this purpose the rod 61 is provided with a circumferential groove 73 which may be engaged by a piston 74 disposed in a bore 76 of block 63.

To activate the piston 74 to clamp rod 61 in fixed position in order to condition the vehicle for remote operation, fluid under pressure from a pump 77 is admitted to bore 76 through a two-position manually operated valve 78. Valve 78 has an alternate nonremote control position at which the fluid from pump 77 is diverted to a return line 79 to the fluid reservoir 81 while bore 76 is also vented to the return line to release piston 74 and enable the rod 61 and cylinder assembly 54 to move axially.

To maintain a predetermined constant fluid pressure from pump 77 during remote control operation, a pressure relief valve 80 is coupled to bore 76 and an accumulator 82 may be coupled to the fluid output line 83 from pump 77. As shown in FIG. 1, the remote control system activating valve 78 is situated on the motor vehicle 11 at a position where it may readily be operated by personnel standing adjacent the vehicle.

Referring now to FIG. 5 in combination with FIG. 4A, overridable detent mechanisms 84 are situated in front and rear blocks 68 and 69 of lift control cylinder assembly 54 in order to hold the rods 57 and 61 at the particular axial position wherein the groove 73 of rod 61 is adjacent piston 74 when the remote control activating valve 78 is operated. As best seen in FIG. 5 in particular, each such detent 84 may be comprised of a ball 86 disposed at one end of a cylindrical retainer 87 and acted upon by a compression spring 88 which urges the ball into a groove 89 in the associated one of the rods such as rod 57. The detents 84 are positioned to engage the associated rods 57 and 61 when the front piston is at midposition in cylindrical member 66 and the rear piston 72 is abutted against center block 67. Groove 73 of rod 61 is then in position to be engaged by piston 74 provided that lift control valve 36 is at the normal Hold position.

Referring now again to FIG. 4A, the lift control valve 36 maybe shifted to any of the four positions thereof, when rod 61 is clamped, by admitting high-pressure fluid from pump 77 to appropriate regions of the cylinder assembly 54 while venting the other regions thereof. Three two-position solenoid-operated valves 91, 92 ad 93 are utilized for this purpose. Valve 91 is spring biased to an unenergized position at which the rod side of both pistons 71 and 72 are vented to drain line 79 and has an energized position at which the rod sides of both pistons are communicated with pressurized fluid line 83. Solenoid valve 92 is spring biased towards an unenergized position at which the head side of piston 71 is vented to the drain line and has an energized position at which the pressurized fluid line 83 is communicated therewith. Solenoid valve 93 is spring biased towards an unenergized position at which the head side of piston 72 is vented to drain line 79 and has an energized position at which pressurized fluid supply line 83 is communicated with the head side of piston 72.

When the vehicle is manually controlled by an operator thereon, each of the control valves 91, 92 and 93 is unenergized and thus both sides of both pistons 71 and 72 are vented to drain line 79. Remote control is effected by energizing various combinations of the solenoid valves. In order to cause cylinder assembly 54 to shift the lift control valve 36 to the Raise setting, solenoid valve 91 is energized thereby admitting high-pressure fluid to the rod side of both pistons 71 and 72. This causes the piston 71 to move towards center block 67, shifting the control valve 36 to the Raise position. In order to shift the control valve 36 to the Lower position, solenoid valve 91 is deenergized and solenoid valve 92 is energized. This admits high-pressure fluid to the head side of piston 71 causing rod 57 to advance to effect the desired shift of valve 36. In order to shift valve 36 to the Float position, both solenoid valves 92 and 93 are energized. This admits high-pressure fluid to the head sides of both piston 71 and 72 extending the cylinder assembly 54 to the maximum extent. Upon deenergization of all three solenoid valves 91, 92 and 93, springs 37 restore the lift control valve 36 to the Hold position.

The solenoid valves 91, 92 and 93 are each connected to a suitable electrical power supply, such as the vehicle battery 94, through an associated individual one of a series of electrical switching circuits 96 of the form which can be operated by radio signals from a remote source or by electrical signals transmitted through a cable or any other equivalent means for controlling electrical switches from a remote point. Radio control is utilized in this particular example and as shown in FIG. 1, a radio receiver 97 with antenna 98 is disposed on the loader 11 for this purpose. Suitable electrical circuits for operating electrical switches 96 in response to radio signals and means for producing the appropriate signals are described in the above-identified copending application Ser. No. 822,368.

Referring again to FIG. 4A, the remote control cylinder assembly 56 for operating the tilt control valve 44 may be of simpler construction as the tilt control valve has only three positions. In particular, cylinder assembly 56 has a single cylindrical member 99 closed at the forward end by a front block 101 and at the back end by a rear block 102 to which rod 62 is rigidly attached. Forward rod 57 transpierces the front block 101 and is connected to a piston 103 within cylinder 99. Detent mechanisms 84', similar to the previously described detents 84, are disposed within front block 101 to engage a circumferential groove 89' in forward rod 57 whereby the cylinder assembly 56 tends to resist extension or contraction during control of the vehicle by an operator thereon. The groove 89' on rod 57 is located at a position whereby the detents engage when piston 103 is at a centered position midway between front and rear blocks 101 and 102.

Owing to the detents 84', the cylinder assembly 56 will simply shift as a unit, with rod 62 sliding in support block 63, when the tilt control valve 44 is operated by manipulating control lever 28. In order to clamp rod 62 against axial motion to condition the system for remotely controlled operation, a second piston 74' is disposed in support block 63 in position to engage a groove 73' on rod 62 when pressurized fluid is supplied to bore 76' by operation for the remote control activating valve 78. Centering springs 46 of tilt control valve 44 and detent 84' position the groove 73' for this purpose.

With rod 62 clamped as described above, extension of the cylinder assembly 56 acts to shift tilt control valve 44 to the Dump position while contraction of the cylinder assembly acts to shift the control valve to the Rackback setting. The cylinder 56 is controlled for this purpose, in response to signals from a remote source, by addition and solenoid valves 106 and 107. Solenoid valve 106 is spring biased to an unenergized position at which the head side of piston 103 is vented to drain line 79 and has an energized position at which the e head side of the piston is communicated with the pressurized fluid line 83. Similarly, solenoid valve 107 is spring biased to an unenergized position at which the rod side of piston 103 is vented to drain line 74 and had an energized position at which the rod side of the position is communicated to the pressurized fluid line. Accordingly, the Dump setting of control valve 44 may be realized by energizing solenoid valve 106 while the Rackback setting of the control valve is achieved by energizing solenoid valve 107. Each of the solenoid valves 106 and 107 is connected to the vehicle battery 94 through an associated individual one of the remotely controlled electrical switching circuits 96.

Referring now to FIG. 4B, the cylinder assembly 53 for operating the vehicle throttle in response to signals from a remote source is also a compound cylinder having two axially spaced cylindrical members 108 and 109 with a center block 111 therebetween. The forward end is closed by a front block 112 adjacent member 109 and the back end is closed by a rear block 113 adjacent member 108. The forward portion of throttle operating link 51' is continuous with a rod 110 transpierced through front block 112 and extending into cylindrical member 109 to connect with a piston 114 therein While the rearward portion of the control link with51' is continuous with a rear rod 115 which extends through rear block 113 to connect with a piston 116 in the rear cylindrical member 108. Each of the 109 members 108 and 109 has a compression spring 117 disposed coaxially therein to urge the associated one of the pistons 114 and 116 towards center block 111. Thus the cylinder assembly 53 as a whole is normally maintained in a contracted position and as previously described simply acts as a rigid portion of the throttle control link 51' when the vehicle is controlled by an operator thereon.

Referring now to FIG. 3 in conjunction with FIG. 4B, the throttle control linkage is readied for remote operation by immobilizing the throttle lever 29, a bolt 120 being transpierced through a tab 120' on the lever and engaged in adjacent stationary structure in this example. Under this condition the admission of high-pressure fluid to the head side of a single one of the pistons 114 and 116 causes the cylinder assembly 53 to extend to a halfway position of realizing a half-throttle setting at the engine governor. By admitting high-pressure fluid to the head ends of both pistons 114 and 116 the cylinder assembly 53 is fully extended to achieve the full-throttle setting of the governor. Upon release of high-pressure fluid from both pistons, springs 117 contract the cylinder assembly 53 to restore the throttle to the idling position. As each of these positions is determined by abutment of positions against blocks, precision and consistency are realized.

Controls for this purpose include a first solenoid-operated two-position spool valve 118 which is spring biased towards an unenergized position at which a passage 119 in center block 111 is vented to the fluid return line 79. Passage 119 communicates with the head end of piston 116. Solenoid valve 118 may be energized by remotely initiated closing of an associated one of the switching circuits 96 to shift to a second position at which high-pressure fluid from supply line 83 is transmitted to passage 119 to extend the cylinder assembly 53 to the half-throttle position. To avoid interference with the piston motion by fluid which may leak past the piston, the rod side of piston 116 is communicated with fluid return line 79 by a passage 121 in rear block 113.

An additional solenoid control valve 122 is spring biased to an unenergized position at which a passage 123 in intermediate block 111 is vented to fluid return line 79 and maybe energized by closing of an associated one of the remotely activate activated switching circuits 96 to shift to a position at which passage 123 is communicated with high-pressure fluid supply line 83. Passage 123 communicates with the head end of piston 114 and an additional passage 124 in front block 112 communicates the rod side of piston 114 with fluid return line 79. Accordingly, if both solenoid valves 118 and 122 are energized, cylinder assembly 53 extends to the maximum extent to realize the full-throttle position.

To provide a convenient means for adjusting the cylinder assembly 53 to selectively change the half-throttle position and the full-throttle position, each of the rods 110 and 115 have enlarged portions 126 and 127 respectively, adjacent pistons 114 and 116, to for annular shoulders 128. Externally threaded adjustment sleeves 129 are threaded into front and rear blocks 112 and 113 in coaxial relationship to the rods and the inner ends of the sleeves define surfaces against which the shoulders 128 abut after predetermined amounts of travel. Because of the threaded engagements of sleeves 129 with the associated blocks 112 and 113, rotation of either sleeve advances the sleeve or retracts the sleeve to selectively vary the travel of the pistons 114 and 116. Both front block 112 and rear block 113 have a setscrew 131 engaged therein to bear against the associated sleeves 129 to aid in holding the sleeve at the selected axial positions.

What is claimed is:

1. In a vehicle having at least one component which may be controlled by manually shifting an associated control linkage, means for alternately controlling said component in response to signals received from a remote location comprising;

an extensible and contractable fluid-operated cylinder having a first end coupled to said linkage and having a second end, means for supporting said second end of said cylinder while providing for movement of said cylinder as a unit relative to said support means said linkage is manually shifted to control said component, means for selectively clamping said second end of said cylinder against motion relative to said support means whereby extension and contraction of said cylinder operates said control linkage, and means for selectively directing high-pressure fluid to said cylinder in response to said signals from a remote location.

2. The combination defined in claim 1 wherein said vehicle has a plurality of said components and a plurality of said manually shiftable control linkages each operative upon an individual one of said components and wherein said vehicle has a plurality of said cylinders, each cylinder having said first end thereof coupled to an individual one of said control linkages and wherein said means for selectively clamping said second end of said cylinder is simultaneously operative upon the second ends of each of said cylinders whereby a plurality of said control linkages are conditioned for remote operation by activating said clamping means.

3. The combination defined in claim 2 wherein said plurality of cylinders are linear and disposed in parallel relationship and wherein said support means supports said second ends of each of said parallel cylinders, said support means having a member through which said second ends of said cylinders are slidingly transpierced and wherein said means for selectively clamping said second ends of said cylinders comprises piston means disposed in said support means member and movable therein in response to fluid pressure between a position at which said second ends of said cylinders may slide in said member and a position at which said second ends of said cylinders are held against sliding movement relative to said member, further comprising a manually operated valve for selectively applying said fluid to said piston means whereby operation of said valve conditions said vehicle for remote control.

4. The combination defined in claim 1 wherein said fluid-operated cylinder has a movable piston therein and rod means extending axially from said piston to define one end of said cylinder further comprising detent means for resisting movement of said piston away from a predetermined position within said cylinder whereby said cylinder shifts as a unit when said control linkage is operated manually.

5. The combination defined in claim 1 wherein said cylinder had cylindrical means with a pair of axially removable pistons therein and has a central transverse partition between said pistons dividing said cylindrical means into first and second piston chambers and has means closing the ends of said cylindrical means remote from said central partition, said cylinder having a first rod extending from a first of said pistons through the adjacent one of said end closures to form said first end of said cylinder and having a second rod extending from the other of said pistons through the other of said end closures to define said second end of said cylinder, and wherein said means for selectively applying high-pressure fluid to said cylinder in response to signals from a remote location comprises:

a first remotely operated valve means for selectively applying high-pressure fluid to said cylinder at the rod sides of both of said pistons and having a second position at which said rod sides of both of said pistons are vented, a second remotely operated valve for selectively applying high-pressure fluid to the head side of a first of said pistons and having a second position at which said head side of said first piston is vented, and a third remotely operated valve for selectively applying high-pressure fluid to the head side of the second of said pistons and having a second position at which said head side of second position is vented.

6. In a vehicle having a component which is controlled by manually shifting a control linkage wherein said linkage is shiftable between first and second extreme positions and a predetermined intermediate position, means for controlling said component in response to signals from a remote location comprising:

a fluid-operated extensible cylinder having first and second axially spaced piston chambers therein separated by a transverse central partition and having closure members at the ends remote from said central partition, a pair of slidable pistons each disposed in a separate one of said piston chambers of said cylinder, resilient means disposed in each of said piston chambers and acting on said piston therein to urge said piston towards central partition, a pair of axially spaced rods each extending axially into a separate one of said piston chambers through said end closure thereat and coupled to said piston in said chamber, valve means for selectively admitting high-pressure fluid to said first piston chamber and for selectively admitting high-pressure fluid to said second piston chamber to act on said pistons in opposition to the force of said resilient means thereon in response to said signals from said remote location, said cylinders including said rods constituting a portion of said manually shiftable control linkage whereby said cylinder functions as a rigid link when said component is controlled manually.

7. The combination defined in claim 6 further comprising axially adjustable means for adjusting the stroke of at least one of said pistons.

* * * * *

UNITED STATES PATENT OFFICE
CERTIFICATE OF CORRECTION

Patent No. 3,631,762           Dated January 4, 1972

Inventor(s) Joe E. Fuzzell

It is certified that error appears in the above-identified patent and that said Letters Patent are hereby corrected as shown below:

CLAIM 1
Col. 8, Line 3, after "means" insert --as--.

Signed and sealed this 16th day of May 1972.

(SEAL)
Attest:'

EDWARD M. FLETCHER, JR.
Attesting Officer

ROBERT GOTTSCHALK
Commissioner of Patents